US012609587B2

(12) United States Patent
Kuebler et al.

(10) Patent No.: US 12,609,587 B2
(45) Date of Patent: Apr. 21, 2026

(54) COOLING SYSTEM FOR AN ELECTRIC TRACTION MACHINE FOR A MOTOR VEHICLE

(71) Applicant: Dr. Ing. h.c. F. Porsche Aktiengesellschaft, Stuttgart (DE)

(72) Inventors: Simon Kuebler, Untergruppenbach Unterheinriet (DE); Stefan Oechslen, Stuttgart (DE)

(73) Assignee: DR. ING. H.C. F. PORSCHE AKTIENGESELLSCHAFT, Stuttgart (DE)

( * ) Notice: Subject to any disclaimer, the term of this patent is extended or adjusted under 35 U.S.C. 154(b) by 294 days.

(21) Appl. No.: 18/321,801

(22) Filed: May 23, 2023

(65) Prior Publication Data

US 2023/0387752 A1 Nov. 30, 2023

(30) Foreign Application Priority Data

May 30, 2022 (DE) .......................... 102022113569.1

(51) Int. Cl.
| | |
|---|---|
| *H02K 9/193* | (2006.01) |
| *H02K 7/00* | (2006.01) |
| *H02K 9/18* | (2006.01) |

(52) U.S. Cl.
CPC ............. *H02K 9/193* (2013.01); *H02K 7/006* (2013.01); *H02K 9/18* (2013.01)

(58) Field of Classification Search
CPC .......... H02K 9/193; H02K 7/006; H02K 9/18; H02K 9/04; H02K 9/19; H02K 9/26;
(Continued)

(56) References Cited

U.S. PATENT DOCUMENTS

| | | | |
|---|---|---|---|
| 5,031,579 | A | 7/1991 | Evans |
| 7,403,849 | B1 | 7/2008 | Watanabe et al. |

(Continued)

FOREIGN PATENT DOCUMENTS

| | | |
|---|---|---|
| DE | 102021203301 A1 | 10/2022 |
| EP | 0545789 A1 | 6/1993 |

(Continued)

OTHER PUBLICATIONS

JP2015159679A English translation (Year: 2025).*

*Primary Examiner* — Christopher M Koehler
*Assistant Examiner* — Viswanathan Subramanian
(74) *Attorney, Agent, or Firm* — LEYDIG, VOIT & MAYER, LTD.

(57) ABSTRACT

A cooling system for an electric traction machine for a motor vehicle includes a looped conduit system for conducting a first cooling liquid and a circulation pump for conveying the first cooling liquid in the looped conduit system in a first circulation direction. The system further includes an expansion tank filled at least partially with the first cooling liquid and at least partially with a gas and a motor input terminal for fluidically connecting the looped conduit system on an input side to an electric traction machine to be temperature-controlled. The system further includes a motor output terminal for fluidically connecting the looped conduit system on an output side to the traction machine and a first heat exchanger for dissipating heat from and/or supplying heat to the first cooling liquid. The expansion tank is configured with an aperture that is open to the environment.

15 Claims, 3 Drawing Sheets

(58) Field of Classification Search
CPC .... B60K 11/02; B60K 2001/006; B60K 1/00;
B60K 11/04; B60K 11/06; B60K
2001/008; B60Y 2200/91; B60Y 2306/05;
B60Y 2400/60; Y02T 10/64
USPC .......................................................... 310/58
See application file for complete search history.

(56) References Cited

U.S. PATENT DOCUMENTS

| | | | |
|---|---|---|---|
| 2008/0190385 A1 | | 8/2008 | Bangert et al. |
| 2016/0146093 A1 | | 5/2016 | Takahashi et al. |
| 2021/0376685 A1 | * | 12/2021 | Hacklberger .......... H02K 5/203 |
| 2022/0014402 A1 | * | 1/2022 | Nelles ..................... H04L 27/12 |
| 2024/0227582 A9 | * | 7/2024 | Haas ................... H01M 50/249 |

FOREIGN PATENT DOCUMENTS

| | | | |
|---|---|---|---|
| JP | H05-504806 | A | 7/1993 |
| JP | H05-340246 | A | 12/1993 |
| JP | 2648639 | B | 9/1997 |
| JP | 2006067735 | A | 3/2006 |
| JP | 2008190385 | A | 8/2008 |
| JP | 2010229875 | A | 10/2010 |
| JP | 2015159679 | A | 9/2015 |

* cited by examiner

COOLING SYSTEM FOR AN ELECTRIC TRACTION MACHINE FOR A MOTOR VEHICLE

CROSS REFERENCE TO RELATED APPLICATIONS

This application claims benefit to German Patent Application No. DE 10 2022 113 569.1, filed on May 30, 2022, which is hereby incorporated by reference herein.

FIELD

The invention relates to a cooling system for an electric traction machine for a motor vehicle, a thermal management module having such a cooling system for a powertrain of a motor vehicle, a powertrain having such a thermal management module for a motor vehicle, and a motor vehicle having such a powertrain.

BACKGROUND

From the prior art, cooling systems for electric traction machines are known for dissipating the resulting waste heat in case of a power demand. For increased cooling capacity, the idea is to immediately perfuse at least the stator of an electric traction machine with a coolant, wherein the coolant is to be configured as a dielectric cooling liquid. It is sensible to cool as few components as possible in this dielectric cooling system. Other components of a powertrain in which such an electric traction machine is integrated, such as a transmission and a pulse inverter, are preferably cooled in at least one separate cooling circuit. For example, a transmission is cooled by means of an oil circuit such that the coolant (oil) is simultaneously configured so as to lubricate the transmission components. For example, a pulse inverter is arranged in a water circuit, with which further vehicle components are preferably coolable.

Due to unavoidable temperature fluctuations in the cooling liquid, there are volume changes in the cooling liquid and consequently pressure fluctuations, which sometimes lead to impermissibly high or low operating pressures. An expansion tank is provided for this purpose, in which the cooling liquid can carry out a volume change with a low pressure change compared to a (slightly compressible) gas. For this purpose, it is necessary that the (lighter) gas is always arranged above the (heavier) cooling liquid in the earth's gravitational field.

SUMMARY

In an embodiment, the present disclosure provides a cooling system for an electric traction machine for a motor vehicle, comprising a looped conduit system for conducting a first cooling liquid to be circulated and a circulation pump for conveying the first cooling liquid in the looped conduit system in a first circulation direction. The system further comprises an expansion tank, which is filled at least partially with the first cooling liquid to be circulated in the looped conduit system and at least partially with a gas and a motor input terminal for fluidically connecting the looped conduit system on an input side to an electric traction machine to be temperature-controlled. The system further comprises a motor output terminal for fluidically connecting the looped conduit system on an output side to the traction machine to be temperature-controlled and a first heat exchanger for dissipating heat from and/or supplying heat to the first cooling liquid to be circulated in the looped conduit system. The expansion tank is configured with an aperture that is open to the environment.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
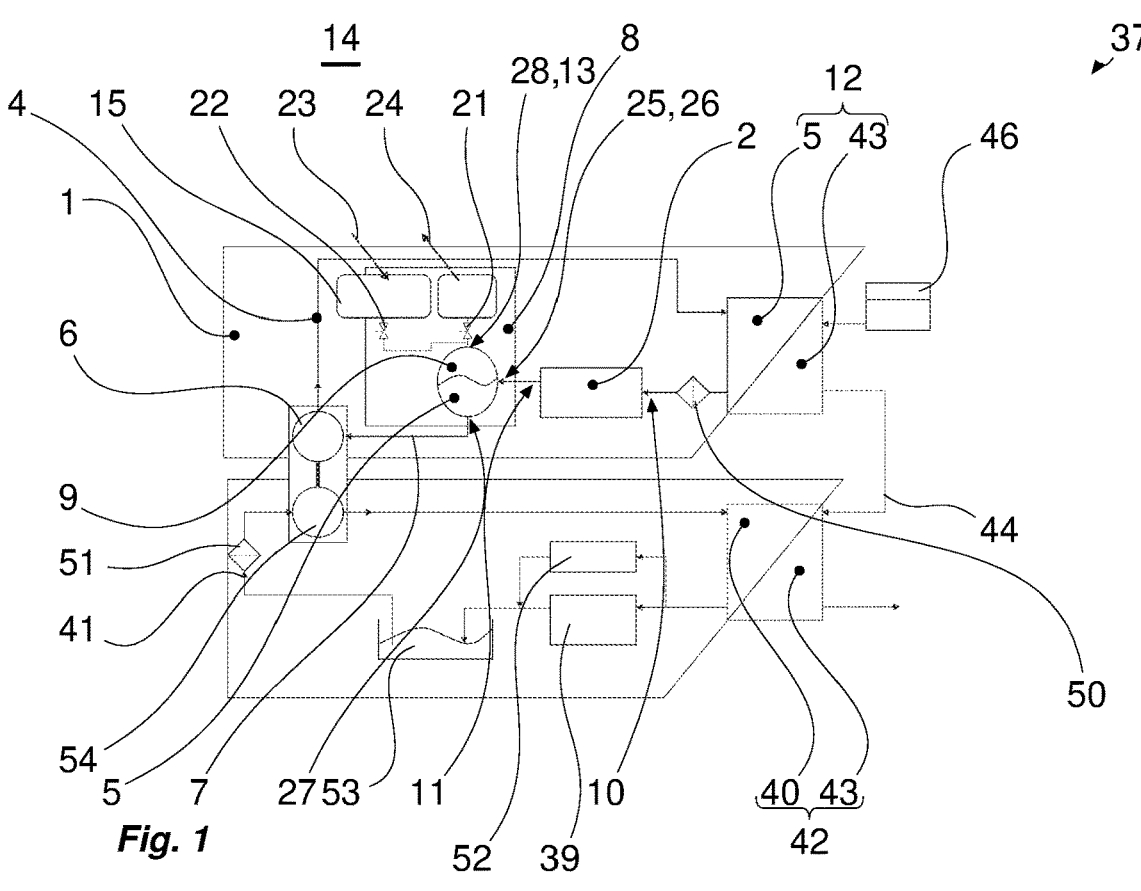
FIG. 1 illustrates a thermal management module in a schematic diagram.

In an embodiment, the present invention at least partially overcomes the disadvantages known from the prior art. The features described herein can be combined in any technically meaningful manner, wherein the explanations from the following description as well as features from the figures, which comprise supplementary configurations of embodiments of the invention, can also be used for this purpose.

In an embodiment, the invention relates to a cooling system for an electric traction machine for a motor vehicle, comprising at least the following components:

- a looped conduit system for conducting a first cooling liquid to be circulated;
- a circulation pump for conveying the first cooling liquid in the looped conduit system in a first circulation direction;
- an expansion tank filled at least partially with the first cooling liquid to be circulated in the looped conduit system and at least partially with a gas;
- a motor input terminal for fluidically connecting the looped conduit system on the input side to an electric traction machine to be temperature-controlled;
- a motor output terminal for fluidically connecting the looped conduit system on the output side to the electric traction machine to be temperature-controlled; and
- a first heat exchanger for dissipating heat from and/or supplying heat to the first cooling liquid to be circulated in the looped conduit system.

The cooling system is characterized in particular in that the expansion tank is arranged with an aperture to the surrounding environment.

Ordinal numbers used in the description above and below are used only for clear differentiation and do not reflect any order or ranking of the designated components, unless explicitly indicated otherwise. An ordinal number greater than one does not necessitate that a further such component must necessarily be present.

There is the problem that inadmissibly high pressures or too low pressures can occur in the cooling system or the looped conduit system as a result of temperature fluctuations. An equalization as described above by means of an expansion tank is therefore advantageous. In an embodiment, the system is open to the environment for a particularly high volume fluctuation.

In advance, it should be noted that, with the cooling system described here, waste heat must primarily be dissipated, but an increase in the temperature of components temperature-controlled by the cooling system is also a possible operating condition, for example in winter temperatures, so that the components are brought quickly to operating temperature. In most applications, however, waste heat is also to be dissipated in winter temperatures in the operation of an electric traction machine of a motor vehicle, i.e. cooling is the goal.

It should further be noted that, for clarity in terms of components and properties to be described later, components and properties of the cooling system having the same name are respectively designated as "first" components or properties, wherein this is not always done in a clear context.

The cooling system comprises a looped conduit system comprising a plurality of conduits and/or conduit portions between the components of the cooling system. Within the looped conduit system, the first cooling liquid is encapsulated against an environment and thus a loss of gaseous contents occurs thereat most in a negligible amount (for example as a result of leakages). A (first) circulation pump is provided for circulating the first cooling liquid. A pressure gradient is generated by the circulation pump, resulting in a (first) circulation direction in the looped conduit system. In one embodiment, the circulation pump is reversibly operable, but the first circulation direction is the main direction of operation, at least when dissipating waste heat from the integrated electric traction machine. A reversal of the direction is adjustable, for example, by reversing the direction of rotation of a pump wheel, but preferably by way of a corresponding way-valve.

The expansion tank is configured so as to equalize the volume between the looped conduit system with a first cooling liquid and an (easily compressible) gas, for example air from an environment, in order to avoid exceeding a predetermined pressure threshold as a function of changes in temperature and resulting volume changes of the first cooling liquid in the looped conduit system. In one embodiment, the expansion tank is configured in a closed fashion, wherein a gas in the expansion tank is compressed and the resulting pressure increase within an operational state according to the design in the looped conduit system does not exceed a predetermined pressure threshold. Alternatively, the expansion tank is configured open, wherein a gas from an (immediate) environment (preferably air) is discharged from the expansion tank during a volume increase and sucked in during a volume decrease. In one embodiment, a semi-open expansion tank is provided, in which a gas is discharged and supplied according to the type of open expansion tank, wherein but this does not occur from an open environment, but rather from a connected expansion tank, preferably with a variable volume, for example using a bellows or the like.

Optionally, a further task of the expansion tank is that gas traps in the first cooling liquid are separable as a result of a pressure gradient present to the gas, which are discharged to the environment or supplied to an enclosed gas.

An electric traction machine is integrated into the cooling system for temperature control by supplying the first cooling fluid via a motor input terminal and again dissipating the introduced first cooling fluid from the electric traction machine via a motor output terminal. It should be noted that when the (first) circulation direction is reversed, an output is formed from the motor input terminal and an input is formed from the motor output terminal. However, preferably, even then, the direction of flow via the electric traction machine remains the same, i.e. the motor input terminal has an input and the motor output terminal has an output for the first cooling liquid, wherein this is achieved, for example, by means of a corresponding conduction and/or at least one switchable way-valve.

The (first) heat exchanger is configured so as to transfer heat between two fluids, i.e. the first cooling liquid and a further fluid (for example water or ambient air). In one embodiment for air cooling, for example, a fan is included.

In an advantageous embodiment, the conductive spacing between the expansion tank and the heat exchanger in the looped conduit system is as short as possible so that heat input is low until the expansion tank is reached. Alternatively or additionally, a conduction section between the expansion tank and the heat exchanger in the looped conduit system is thermally isolated and/or spaced as far apart as possible from other heat sources, in particular from the electric traction machine to be temperature-controlled.

In an advantageous embodiment of the cooling system, an adsorption filter is provided from the aperture to the environment of the expansion tank for filtering of passing air, wherein the adsorption filter comprises a desiccant and/or activated carbon.

An embodiment provides an adsorption filter, which consists of an output, in order to thus retain hydrocarbon compounds, for example, wherein an activated carbon filter is suitable for this purpose. In an advantageous embodiment, there is also provided a desiccant, for example a granulate, in order to exclude the leakage of moisture into the environment. In an advantageous embodiment, the same adsorption filter is also comprised from the input of the expansion tank in order to thus prevent the ingress of undesirable constituents into the expansion tank space of the expansion tank.

In an advantageous embodiment of the cooling system, the aperture of the expansion tank may be communicatively connected to the environment via a calming section, wherein, preferably by means of the calming section, liquid is separable from a gas flow passing through the calming section via a calming labyrinth, and/or
wherein, preferably by means of the calming section, an increased pressure in a gas flow passing the calming section can be produced as compared to the pressure in the aperture of the expansion tank.

In an embodiment, the aperture of the expansion tank facing the environment is preferably communicatively connected to the surrounding environment solely by means of a calming section. A calming section has the advantage that, due to a slowing of the flow, liquid components can continue to settle, which are preferably collected again and circulated, or are discharged separately (insofar as it concerns liquid penetrating from the outside, for example condensation water) to the outside, for example by dripping off.

In an advantageous embodiment, the calming section comprises a calming labyrinth with which liquid, particularly preferably humidity, can be separated from incoming air by way of condensation. In the same or an alternative embodiment, cooling liquid escaping from the inside (possibly also in the form of droplets dissolved or borne in the flowing gas) can be separated by means of the calming labyrinth in by means of the calming section.

In an advantageous embodiment, a pressure is increased in the calming section compared to the pressure in the aperture of the expansion tank. Thus, for example, the solubility of the gas for a liquid or moisture is increased compared to the gas in the region of the aperture of the expansion tank and thus a penetration of moisture in the region of the aperture is reduced. Above all, however, by means of a higher pressure in the calming section, an additional buffer for a pressure increase in the expansion tank and thus in the looped conduit system can be achieved in comparison to the aperture, without necessarily having to exchange with the environment. This reduces the ingress of dirt and liquid from the outside or the penetration of hydrocarbon compounds from the inside to a few states and in a given case an existing adsorption filter is used less often and thus protected for a longer service life and/or a smaller design for better economy.

In an advantageous embodiment of the cooling system the aperture of the expansion tank to the surrounding environment can be closed by means of at least one valve, wherein preferably the at least one valve is normally closed, and particularly preferably is pressure controlled, and/or wherein preferably at least one of the valves, particularly preferably in response to a pressure threshold and/or a temperature threshold, is switchably closable.

In an embodiment, at least one valve is provided, with which the expansion tank can be closed to the environment, so that an incoming or outgoing connection to the environment can be closed in total or selectively. When a flow into and out of the environment is prevented in that a valve is only opened at a predetermined limit pressure, the adsorption filter is less stressed over the lifetime and can thus have smaller dimensions overall. The ingress of moisture and the escape of hydrocarbon compounds, respectively, are also reduced. Preferably, a valve body is provided for this purpose between the environment and the adsorption filter. Alternatively, the adsorption filter is arranged on the environment side of the valve, because a flow of the adsorption filter with the valve closed also occurs in negligible amounts. Such a variant is preferably equipped with additional protection against dirt and, if applicable, spray water, such that the adsorption filter is protected against soiling and at the same time the valve is in a region protected by means of the adsorption filter, in which there is little to no liquid. In the reverse embodiment, the valve itself is made robust or is also protected against soiling and, if applicable, spray water by means of additional protection, as described above.

For example, in a preferred embodiment in which the normally closed valve can be opened by pressure control, a spring is provided for passive opening so that the valve body is opened upon exceeding the spring force as a result of the applied pressure and closed again when the pressure below the spring force drops.

In an embodiment, a valve is additionally or alternatively provided, which can be closed switchably, i.e. is opened and closed by means of electronic control. For this purpose, a pressure sensor and/or a temperature sensor are provided correspondingly, which cause the valve to open according to a corresponding control loop. By means of the valve, with a suitable design, it is achieved that a pressure fluctuation occurs within the looped conduit system, however an exchange with the environment only occurs within desired limits (namely the respective pressure thresholds and/or temperature thresholds) and only when a corresponding threshold is exceeded, such that the adsorption filter is significantly less stressed in one operation and thus the service life of the system is increased or the cost of such a system is reduced due to the lower stress.

In an advantageous embodiment of the cooling system, the aperture of the expansion tank may be communicatively connected to the environment via an input and an output, wherein, for filtering of air solely via a semi-permeable membrane, the output is in connection with the environment and in a dirt-repelling and/or liquid-repelling manner.

In an embodiment, the expansion tank is open to the environment, wherein a semi-permeable membrane is provided in the output. The semi-permeable membrane ensures that hydrocarbon compounds are prevented from leaking, such that no or only a negligible amount escapes.

It should be noted that the semi-permeability is described here from a technical point of view, i.e. with regard to sufficient functionality and under the aspect of economy, so that leaks can certainly occur. It is also not taken into account that damage can occur to the membrane in case of a basic or acidic liquid, thereby impairing the repelling function. Further protection for the membrane is provided, for example, so that spray water, especially when salt is used on roads against ice in winter, is prevented from impacting the membrane or from excessively impacting the membrane. For example, a labyrinth and/or channel constriction is sufficient, because the flow rates for the operating conditions are low in most cases. For example, a suitable membrane is a porous textile, preferably having a hydrophobic surface (for example, by means of a corresponding coating).

According to a further aspect, a cooling system is provided comprising an expansion tank having at least the following components:

at least one inlet for a first cooling liquid;

a first outlet for the first cooling liquid;

a second outlet for a gas; and a connecting channel between the at least one inlet and the
  outlet, wherein the connecting channel is configured so as to flare from the at least one inlet towards the first outlet for the first cooling liquid, wherein, in the installation situation, one of the inlets for the first cooling liquid and the second outlet for a gas is arranged in each operating state above the first outlet for the first cooling liquid by means of a horizontal and/or vertical offset.

In this case, an expansion tank is provided, in which it is ensured that the inlet for the first cooling liquid is always arranged above the first outlet for the first cooling liquid due to a horizontal offset in the corresponding installation situation in each operating state. In an application in a motor vehicle, such an expansion tank is subject to strong accelerations, primarily in the transverse direction and in the longitudinal direction of the motor vehicle, i.e. in the directions transverse to the gravitational field of the earth.

The expansion tank comprises an inlet for the first cooling liquid, which enters the expansion tank, for example in a cooling system, after a circulation. In one application, the inlet of an electric traction machine is arranged immediately downstream. Furthermore, a first outlet is provided, via which the first cooling liquid is further circulated in the cooling system or the looped conduit system. For example, the first outlet is arranged immediately upstream of a circulation pump. Via the first outlet, the first cooling liquid enters the looped conduit system, separated as far as possible from gas inclusions, for further conveyance. Furthermore, a second outlet is provided, via which gas can escape, which is separated from the cooling liquid or is displaced due to a volume increase of the cooling liquid (for example, temperature-related). It should be noted that, in a preferred embodiment, the second outlet is also an inlet for a gas, provided that the volume of the first cooling liquid decreases and gas is drawn in from the outside in order to avoid the occurrence of an excessive vacuum. However, it should also be noted that the outlet does not necessarily face a free environment, but is also in one embodiment connected to a further chamber in a guiding manner and an excessive pressure increase or pressure drop in the first cooling liquid or in the looped conduit system is prevented in this case by means of the good compressibility and a corresponding volume of the gas.

A connecting channel is provided between the inlet and the outlet. The connecting channel is configured in a flaring manner so that, assuming a constant conveying rate of the first cooling liquid, a conveying flow rate of the first cooling liquid adjusts a decreasing flow rate here and thus a triggering of trapped gas in the cooling liquid is favored. Alternatively or simultaneously, a pressure decrease occurs due to the widening of the connecting channel towards the first outlet, which also conveys a triggering of gas in the first cooling liquid. It should be noted that a connection between the first outlet and the second outlet (for gas) is preferably formed in a tapering manner towards the second outlet, such that again an acceleration and/or an increase in pressure in the gas in the corresponding operating states ensures a discharge of the gas and a minimum pressure at an interface between the cooling liquid and the gas.

An offset is now provided here, which is horizontal in the installation situation, wherein preferably the offset has about the same horizontal distance to the extremum of the horizontal extension of the connecting channel as the vertical distance. This ensures that the highest point is always formed for the first cooling liquid from this inlet, even if an overall acceleration deviating from geometry is present due to an overlay of the earth acceleration by the vehicle acceleration. Thus, a degassing section within the expansion tank is maximized and thus the expansion tank is particularly efficient for avoiding gas inclusions in the first cooling liquid.

In an advantageous embodiment, a second inlet for the first cooling liquid is provided, wherein this is preferably located below the liquid level when the expansion tank is operated in a cooling system. For example, the second inlet is arranged at about the same height as the first outlet for the first cooling liquid. In a preferred embodiment, the first cooling liquid is then supplied to the expansion tank via both the first inlet (as described above) and the second inlet, such that the degassing path for the first cooling liquid, which enters the expansion tank via the second inlet, is significantly shortened, but it is safely prevented that in an operating state the circulation pump attracts gaseous constituents in greater quantity (a so-called air drawing is avoided).

In an embodiment, the aforementioned expansion tank may be used in the cooling system. It should be noted that the output described here, in which a semi-permeable membrane and/or an adsorption filter is provided, is not synonymous with the second outlet for gas, but rather a further compartment may be arranged downstream, in which such a membrane is possibly arranged and by means of which an input and/or output is formed and connected to the second outlet of the expansion tank and, according to the above definition, an overall system is formed in the cooling system together with the expansion tank described above, which is referred to as an expansion tank in connection with the cooling system. In a further embodiment, the input and the output as previously described are comprised of the second outlet or arranged upstream of the outlet within the expansion tank.

In an advantageous embodiment of the cooling system, the walls of the expansion tank are formed by:
a first tank part comprising the inlet for the first cooling liquid;
a second tank part comprising the outlets; and
a third tank part, from which a partition is formed between the first tank part and the second tank part,
wherein the inlet and the second outlet are communicatively connected to one another solely via a longest extension of the expansion tank.

The expansion tank is particularly easily mountable and inexpensively manufactured by providing three tank parts, wherein preferably the first tank part and the second tank part form an outer wall and the third tank part only forms an inner partition between the two other tank parts. In one embodiment, at least the first tank part and the second tank part are joined together in a material-locking manner, for example by welding or soldering or brazing. The third tank part (partition) is in one embodiment only inserted, preferably also for example in a material-locking, liquid-tight manner and preferably connected gas-tightly to at least one of the other tank parts.

It should be noted the arrangement of the inlets and the outlets on the first tank part and the second tank part respectively does not necessarily mean that the connecting channel runs from the inlet to the outlet only in the first tank part or along the third tank part, but optionally forms a wall from the second tank part of the connecting channel from the start at least towards one side. In a preferred embodiment, only the first tank part and/or the second tank part create a mountability. By means of the partition, a contacting of the expansion tank is created, wherein two channel portions of the connecting channel are created that are parallel to one another. In an advantageous embodiment, in a further spatial orientation, two channel portions of the connecting channel that are parallel to one another are also created from the partition. For example, the third tank part has an L-shape, wherein preferably a portion of one of the L-shaped walls is furthermore kinked, in turn L-shaped, so that a total of three portions are thereby formed that form channel portions within a small spatial extension parallel to one another.

It should be noted that the longest extension of the expansion tank relates to the shape of the expansion tank, wherein the extension of the connecting channel is meant here. In a thin-walled expansion tank, for example, an expansion tank formed from a sheet (for example, via deep-drawing), the shape of the connecting channel corresponds to the outer shape of the expansion tank, and thus the longest extension of the expansion tank corresponds to approximately the outer shape of the expansion tank or approximately the longest extension of the connecting channel. The partition, which is formed from the third tank part, provides for a multiplication of the distance of the connecting channel compared to the longest extension of the expansion tank.

In an advantageous embodiment of the cooling system, a labyrinth for retaining liquid may be formed in the connecting channel between the first outlet for the first cooling liquid and the second outlet for a gas.

The labyrinth provided here is characterized primarily in that no straight-line connection is formed between a plurality of passages in the labyrinth and/or towards the second outlet for gas, such that the labyrinth retains a majority of the first cooling liquid that may flow (for example by a sloshing movement) towards the second outlet, and preferably also cooling liquid entrained by the gas adheres to a corresponding wall of the labyrinth and is thus prevented from flowing towards the second outlet for gas. In a preferred embodiment, the labyrinth is also arranged such that liquid entering from the outside via the outlet, for example spray water or increased humidity from the air from the environment, is retained by the wall of the labyrinth and is not mixed into the first cooling liquid or only in a negligible amount. This is particularly important when the second outlet to the environment is open and at the same time the first cooling liquid is a dielectric cooling liquid, and thus the efficiency of the electrical insulation is reduced in case of ingress of water.

According to a further aspect, a thermal management module for a powertrain of a motor vehicle is provided, comprising at least the following components:

for a transmission, an oil circuit having a second circulation direction and having a second heat exchanger;

for at least one vehicle component, a water circuit having a third circulation direction and having a third heat exchanger; and for an electric traction machine, a cooling system according to one embodiment according to the above description, wherein, preferably, a pulse inverter for the electric traction machine is arranged in the water circuit.

Here, the cooling system described above is integrated into a thermal management module for a powertrain of a motor vehicle, wherein this thermal management module [TMM] is well known for its functions and tasks. In addition to components of a powertrain, other vehicle components are preferably also temperature-controlled, for example a (preferably traction) battery.

Other components of a powertrain in which such an electric traction machine is integrated, such as a transmission and a pulse inverter, are preferably cooled in at least one cooling circuit that is separate from the cooling system. For example, a transmission comprising a (preferably switchable) gear box and/or a differential is cooled by way of an oil circuit with an oil, preferably directly. A direct cooling is a flow that directly contacts component of the transmission (for example gears), for example as a substitute for a lubricant. For example, the oil circuit is conventional. In one advantageous embodiment, a second circulation pump for generating a second circulation direction in the oil circuit is coupled to the first circulation pump for generating the first circulation direction in the looped conduit system for the first cooling liquid as a so-called tandem pump, such that a single drive is sufficient for both circulation pumps. The waste heat is thereby released via the second heat exchanger.

Vehicle components to be temperature-controlled, which are not arranged in the oil circuit or the cooling system, are preferably temperature-controlled by means of a water circuit. The water is often a water-glycol mixture. The water of the water circuit is conveyed (by means of a third circulation pump) in a third circulation direction via a third heat exchanger. The third heat exchanger is preferably configured for heat transfer with the environment or the ambient air, wherein a fan is preferably provided for a (forced) convection on the third heat exchanger.

It should be noted that the respective components are also heatable in the oil circuit and/or the water circuit, for example in winter temperatures, wherein but the main state here is also the dissipation of waste heat. The respective circulation direction is also reversible, where appropriate.

In an advantageous embodiment, a pulse inverter for an electric traction machine to be temperature-controlled by the cooling system with the first cooling liquid is arranged in the water circuit for temperature control, i.e. not a component to be temperature-controlled in the cooling system with the first cooling liquid. It is advantageous to keep the number of components in said cooling system for an electric traction machine low. With a pulse inverter, the use of a dielectric (first) cooling liquid is not necessary. It is therefore advantageous to arrange the pulse inverter outside of said cooling system.

In an advantageous embodiment of the thermal management module, the water circuit may be connected to the first heat exchanger of the cooling system for an electric traction machine for heat transfer, preferably as the only liquid-bonded heat transfer of the cooling system to the environment, wherein, preferably in the third circulation direction of the water circuit, a pulse inverter for an electric traction machine is arranged upstream of the first heat exchanger.

In an embodiment, the cooling system may be heat-coupled to the first cooling liquid and the water circuit, i.e. the water circuit is configured by means of the (first) heat exchanger for temperature control of the first cooling liquid. Thus, in the first heat exchanger, for example upon cooling of the electric traction machine (technically without liquid exchange), the heat is released from the first cooling liquid to the water in the water circuit.

In a preferred embodiment, no further (forced) convection is provided for temperature control of the electric traction machine (and preferably also not further components in the cooling system) and for dissipating heat from the first cooling liquid. Rather, the first heat exchanger is then the only unit of the cooling system for transferring heat, namely with the water circuit.

In a preferred embodiment, the pulse inverter is arranged in the (third) circulation direction of the water circuit upstream of the first heat exchanger so that the temperature gradient above the pulse inverter is as large as possible, while the temperature gradient above the first heat exchanger (due to the mostly very large heat output of the electric traction machine) is still sufficient.

In an advantageous embodiment, a reversing valve is provided for reversing the (first) circulation direction. In one embodiment, the first cooling liquid then passes through a separate return passage. Preferably, the same conduit is used for both directions.

Thus, in the main direction, the order of the components is (beginning with the first circulation pump):

1. the first circulation pump;
2. the first heat exchanger;
3. the electric traction machine; and
4. the expansion tank.

The bypass section according to the above description is preferably arranged within the main direction such that it connects a conduit section of the looped conduit system from the first circulation pump to a conduit section upstream of the expansion tank. And, in the minor direction, the order of the components is:

1'. the first circulation pump;
2'. the electric traction machine
3'. the first heat exchanger; and
4'. the expansion tank.

It should be noted that possible further components in the cooling system are also supplied in reverse, or only a few or exclusively the aforementioned three components are supplied in reverse order.

In an advantageous embodiment of the thermal management module, the water circuit may also be connected to the second heat exchanger of the oil circuit for heat transfer, preferably as the only liquid-bonded heat transfer of the cooling system to the environment, wherein, preferably in the third circulation direction of the water circuit, the first heat exchanger is arranged upstream of the second heat exchanger.

In an embodiment, the oil circuit and the water circuit may be heat-coupled to one another, i.e. the water circuit is configured by means of the (second) heat exchanger for temperature control of the oil. In the second heat exchanger, for example, when the transmission cools (technically without liquid exchange), the heat from the oil in the oil circulation is released to the water in the water circuit.

In a preferred embodiment, no further (forced) convection is provided for temperature control of the transmission (and preferably also not for further components in the oil circuit) and for dissipating heat from the oil. Rather, the second heat exchanger is then the only unit of the oil circuit for heat transfer, namely with the water circuit.

In a preferred embodiment, the first heat exchanger is arranged in the (third) circulation direction of the water circuit upstream of the second heat exchanger so that the temperature gradient above the first heat exchanger is as large as possible, while the temperature gradient above the second heat exchanger (due to the mostly higher permissible temperature level in a transmission in comparison to an electric traction machine) is still sufficient.

According to a further aspect, a powertrain for a motor vehicle is provided, comprising at least the following components:

at least one electric traction machine for providing a torque;
    at least one propulsion wheel for propelling the relevant motor vehicle by means of a torque of the electric traction machine;
    at least one transmission for conducting a torque between the electric traction machine and at least one of the propulsion wheels; and
    a cooling system according to one embodiment according to the above description for at least one of the electric traction machines and/or a thermal management module according to one embodiment according to the above description for at least one of the electric traction machines, at least one of the transmissions and at least one vehicle component, and preferably a pulse inverter for at least one of the electric traction machines.

A powertrain is provided which comprises at least one electric traction machine by means of which torque is generated. The torque of the respective electric traction machine is transferable via a transmission to at least one propulsion wheel. The at least one propulsion wheel is configured so as to drive the motor vehicle forward. The temperature control of the components of the powertrain is performed by a cooling system or a thermal management module comprising a cooling system according to one embodiment according to the above description. For the third heat exchanger, the air of the environment is preferably used, namely passively by means of driving wind and/or actively by means of a fan.

In a further aspect, a motor vehicle is provided, comprising a chassis having a transport cell and a powertrain according to an embodiment according to the description above for driving the automotive vehicle forward.

The motor vehicle is provided for transporting at least one passenger and/or goods and comprises a passenger compartment and/or a cargo cell. The motor vehicle is driven via the at least one propulsion wheel by means of the torque of at least one of the electric traction machines.

An embodiment of the invention described above is explained in detail below with reference to the accompanying drawings, which show preferred configurations, in light of the relevant technical background. Embodiments of the invention are not limited in any way by the purely schematic drawings, wherein it is noted that the drawings are not true to size and are not suited for defining proportions.

In FIG. 1, a thermal management module 37 is shown in a schematic diagram, which comprises a cooling system 1 for an electric traction machine 2. A first heat exchanger 12 of the cooling system 1 is configured here for heat transfer with a water circuit 43 (only shown in a section here), so that the first cooling liquid 5 of the looped conduit 4 of the cooling system 1 and the water (mixture) of the water circuit 43 are in heat exchange with each other. A second heat exchanger 42 of an oil circuit 40 for a transmission 39 is also configured here for heat transfer with the water circuit 43 (shown only in a section here), so that the oil of the oil circuit 40 and the water (mixture) of the water circuit 43 are in heat exchange with each other.

In the water circuit 43, a pulse inverter 46 for the electric traction machine 2 to be temperature-controlled in the cooling system 1 is arranged here, namely in the (third) circulation direction 44 of the water circuit 43 upstream of the first heat exchanger 12 of the cooling system 1 with the first cooling liquid 5. In addition, the second heat exchanger 42 is arranged behind the first heat exchanger 12 in the third circulation direction 44.

In the oil circuit 40, in the (second) circulation direction 41, a transmission 39 and a transmission component 52 are arranged behind the second heat exchanger 42, which are connected here in parallel. Subsequently, an oil sump 53, then a (second) coarse filter 51 and finally (shown in the illustration) a second circulation pump 54, are arranged in the oil circuit 40. The second circulation pump 54 is here (purely optionally) embodied as a tandem pump with a first circulation pump 6 of the cooling system 1 having the first cooling liquid 5.

The cooling system 1 comprises a looped conduit system 4 in which the following components are arranged in the (first) circulation direction 7:

1. the first circulation pump 6;
    2. the first heat exchanger 12;
    3. the electric traction machine 2, which is perfused via a motor input terminal 10 and a motor output terminal 11; and
    4. an expansion tank 8.

As an optional component, the (first) coarse filter 50 in front of the motor input terminal 10 is shown here.

The expansion tank 8 is filled partially with the first cooling liquid 5 and partially with a gas 9, and thus a pressure increase resulting from a temperature-related increase in volume via the compressible gas 9 can be adjusted or at least mitigated. An adsorption filter 15 is also arranged within the expansion tank 8. According to the illustration, a valve 21, 22 is arranged between the environment 14 and the input 23 (with the adsorption filter 15) as well as the output 24 and the expansion tank 8, i.e. to the input 23 (with the adsorption filter 15) as well as to the output 24. The valves 21, 22 are configured so as to close an aperture 13 to the environment 14 of the expansion tank 8 opposite the environment 14 (shown here as dashed arrows). A discharge of gas 9 can be prevented by means of an outflow-side valve 21, for example being pressure-controlled. An inflow of gas 9 can be prevented by means of an inflow-side valve 22, for example being also pressure-controlled. By filtering the adsorption filter 15, it is ensured that, for example, an escape of hydrocarbon compounds from the expansion tank 8 and an ingress of moisture from the environment 14 into the expansion tank 8 is prevented or an amount thereof is negligible. The adsorption filter 15 comprises activated carbon 17 and a desiccant 16 (see FIG. 5) in one advantageous embodiment. Due to the reduction in the number and/or duration of states in which a gas exchange with the environment 14 is performed, an increase in the service life of the adsorption filter 15 can be achieved by means of closure of the valves 21, 22. For this purpose, the valves 21, 22 are preferably designed to be normally closed. The valves 21, 22 are pressure-controlled and/or tempera-ture-controlled in a preferred embodiment example. The valves 21, 22 are thus only open at a pressure threshold and/or a temperature threshold.

It should be noted that, in the embodiment of the thermal management module 37 shown, no heat exchanger is pro-vided from the cooling system 1 and the oil circuit 40 for heat transfer to the environment 14. Rather, the first heat exchanger 12 and the second heat exchanger 42 are coupled to the water circuit 43.

Figure 2:
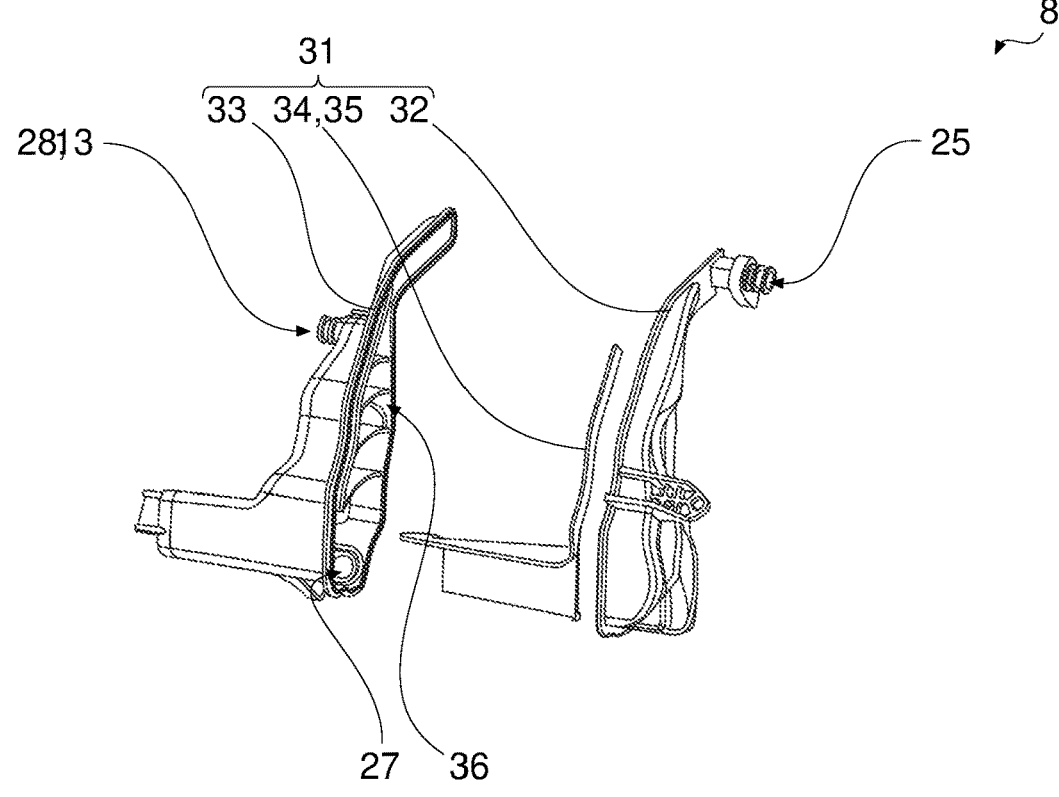
FIG. 2 illustrates an expansion tank in an exploded view.

In FIG. 2, an exploded view of an expansion tank 8 is shown, wherein the expansion tank 8 comprises a first tank part 32, a second tank part 33, and a third tank part 34. The first tank part 32 comprises a first inlet 25, which is configured so as to introduce a first cooling liquid 5 from a looped conduit system 4 (cf. FIG. 1) and (purely optionally) a second inlet 26 (obstructed here, cf. FIG. 3 and FIG. 4). The second tank part 33 forms a labyrinth 36 and comprises a first outlet 27 and a second outlet 28, wherein the second outlet 28 is configured for the discharge of gas 9 and is embodied as an aperture 13. The third tank part 34 forms a partition 35 between the other two tank parts 32, 33, wherein the partition 35 prevents the first cooling liquid 5 from passing directly from the first inlet 25 into the volume with the labyrinth 36 of the second tank part 33 to the second outlet 28. Rather, an extension of the connecting channel 29 (cf. FIG. 3) to be perfused by the first cooling liquid 5 within the expansion tank 8 is created by means of the partition 35. The three tank parts 32, 33, 34 are preferably joined together in a material-locking manner, for example by welding or soldering or brazing. The three tank parts 32, 33, 34 together form a wall 31 of the expansion tank 8 with their outer surface. For example, the tank parts 32, 33, 34 are all or partially formed by means of sheet deformation, for example by means of deep-drawing, or all or partially by means of injection molding. In this embodiment, the internal shape of the expansion tank 8 is distinguished by its externally visible shape, because the wall thickness is thin, and is, for example in the context of the technically feasible production, nearly constant.

The labyrinth 36 formed here by the second tank part 33 is characterized primarily in that no straight connection towards the second outlet 28 (for gas 9) is formed by means of the plurality of passages offset from one another in the labyrinth 36, such that any first cooling liquid 5 flowing towards the second outlet 28 (e.g. by a sloshing movement), is retained by the labyrinth 36 to a large extent and any cooling liquid 5 borne by the gas 9 is also adhered to a corresponding wall 31 of the labyrinth 36 and thus prevented from flowing towards the second outlet 28 for gas 9.

Figure 3:
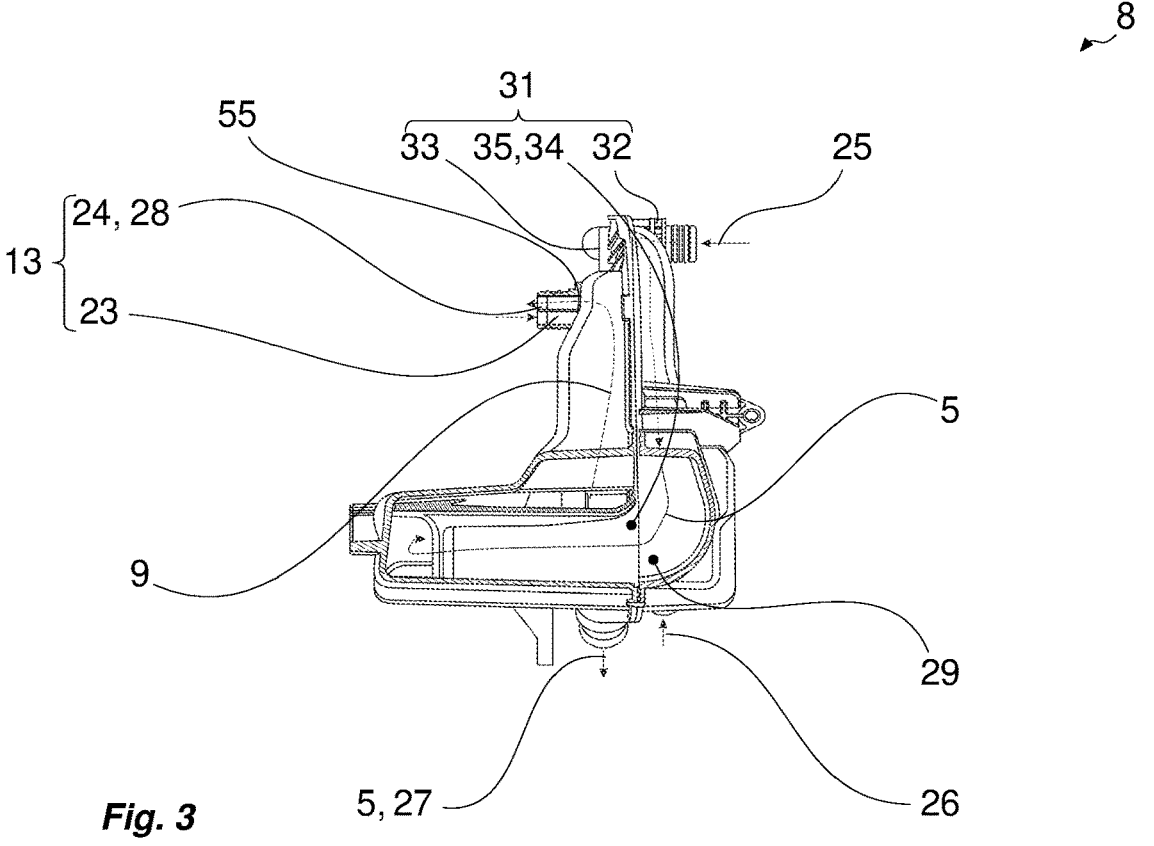
FIG. 3 illustrates the expansion tank according to FIG. 2 in an exploded view.

In FIG. 3, the expansion tank 8 according to FIG. 2 is shown in an exploded view, wherein the three tank parts 32, 33, 34 are sealed together in this view and the wall 31 is closed outwardly. As shown in the illustration, at the upper right end, the first inlet 25 is arranged on the first tank part 32, which is configured so as to introduce the first cooling liquid 5. In this embodiment example, the second inlet 26 is additionally arranged at the lower right end of the tank 8, as shown in the illustration, wherein it is configured so as to be introduced into the first cooling liquid 5. Due to the partition 35 of the third tank part 34, the first cooling liquid 5 is prevented from flowing to the left according to the illustra-tion, and thus partially flows through the connecting channel 29. Here, the connecting channel 29 extends into the image plane and widens towards the first outlet 27. The flow of the first cooling liquid 5 is indicated by the arrow (where not obscured by a solid line and where obscured by a dashed line). Via the first outlet 27, the first cooling liquid 5, as free of gas inclusions as possible, enters back into the further portions of a looped conduit system 4 (cf. FIG. 1) for further conveyance. Furthermore, the second outlet 28 is provided, via which the gas 9 can escape, wherein the gas 9 (or at least the bubble-shaped gas 9) is separated to a large extent along the connecting channel 29 as a result of the deceleration and calming of the first cooling liquid 5 and flows to the higher second outlet 28, as indicated in the illustration with a dash-dotted line. The gas 9 passes through the labyrinth 36 (obscured here, cf. FIG. 4) within the second tank part 33 and exits the second outlet 28.

In this embodiment example, the second outlet 28 (made visible by an aperture) is arranged horizontally in a two-part manner, wherein purely optionally a separating element 55 separates the second outlet 28 (forming an aperture 13 outwardly) into an output 24 and an input 23 for gas 9. The ingress of gas 9 is necessary if the pressure within the looped conduit system 4 would otherwise be excessively reduced due to a volume decrease. It should be noted that, in a preferred embodiment, the outlet is connected to a conduit or a calming section 18 (cf. FIG. 5), which comprises the opening 13 outwardly.

Figure 4:
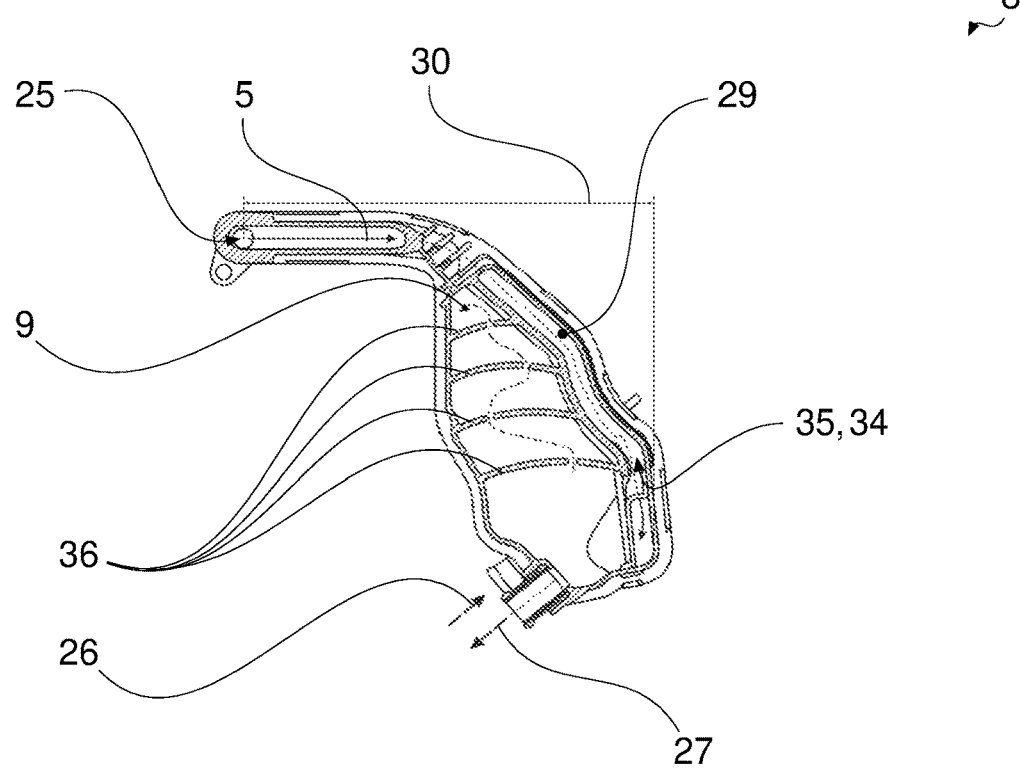
FIG. 4 illustrates the expansion tank according to FIG. 2 and FIG. 3 in a sectional view.

In FIG. 4, the expansion tank 8 according to FIG. 2 and FIG. 3 is shown in a sectional view. Only components which were not or only insufficiently visible in the above descrip-tion are described here. The sectional view is selected here such that the labyrinth 36 is visible, which is formed by the second tank part 33. In this embodiment example, the labyrinth 36 is arranged such that liquid entering from the outside via the second outlet 28 for gas 9 (for example spray water or increased humidity from the air) is retained from the surrounding environment 14 by the wall 31 of the labyrinth 36 and is not mixed into the first cooling liquid 5, respectively, or is mixed only in a negligible amount. The gas 9 separated from the first cooling liquid 5 (shown in a dash-dotted line here a possible gas flow 20) is not disrupted or only to a very small extent by the labyrinth 36 when flowing towards the second outlet 28.

Proceeding outward from plane level from the first inlet 25 to the lower transition of the first cooling liquid 5 in a flow as shown in the illustration plane (cf. FIG. 3), there extends a horizontal and/or vertical offset 30, wherein the offset in the embodiment shown has approximately the same horizontal distance to the extremum of the horizontal exten-sion of the connecting channel 29 as the vertical distance. This ensures that, the first inlet 25 for the first cooling liquid 5 always forms the highest point, even if there is an overall acceleration deviating from the geometrically defined ori-entation due to an overlay of the earth acceleration by the vehicle acceleration. Thus, a degassing section is maximized within the expansion tank 8 and thus the expansion tank 8 is especially efficient for avoiding gas inclusions in the first cooling liquid 5. Therefore, at the lower end of horizontal and/or vertical offset 30 as shown in the illustration, the first outlet 27 is arranged for the first cooling liquid 5.

Figure 5:
FIG. 5 illustrates a calming section in an exploded view.
Figure 5:
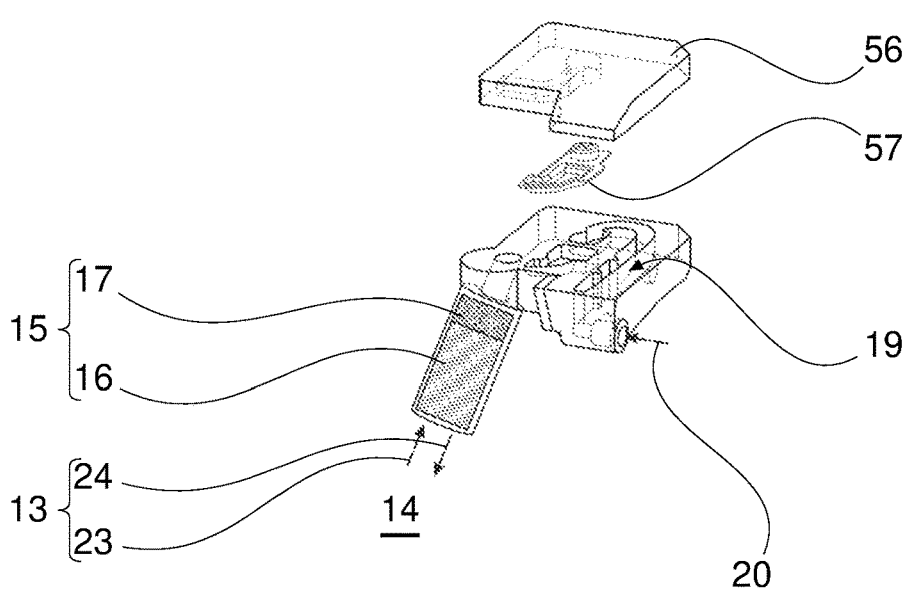

In FIG. 5, a calming section 18 is shown in an exploded view, wherein the calming section 18 comprises purely optionally a lid 56, a separator 57, and a calming labyrinth 19. The calming labyrinth 19 is fluidically connected to the expansion tank 8 by means of an aperture 13, so that a gas flow 20 can flow in and out of the expansion tank 8 into the calming section 18. Gas 9 (or air) incoming from the environment 14 must first flow via an adsorption filter 15 before it can flow into the calming section 18. The adsorption filter 15 here comprises a desiccant 16 (purely optionally arranged on the environment side) and activated carbon 17 (purely optionally arranged on the tank side). The outermost component is formed in the gas flow 20 here from the adsorption filter 15. Preferably, the opening 13 is closed to the environment 14 by means of a valve, preferably a separate valve 21, 22 for the input 23 and the output 24 (cf. FIG. 1).

In this embodiment example, the calming labyrinth 19 is arranged such that liquid is particularly preferably able to separate humidity from the incoming air from the environment 14. In the same or an alternative embodiment example, by means of the calming section 18, cooling liquid 5 escaping from inside (possibly also in the form of droplets dissolved or borne in the flowing gas 9) can be separated by means of the calming labyrinth 19.

Figure 6:
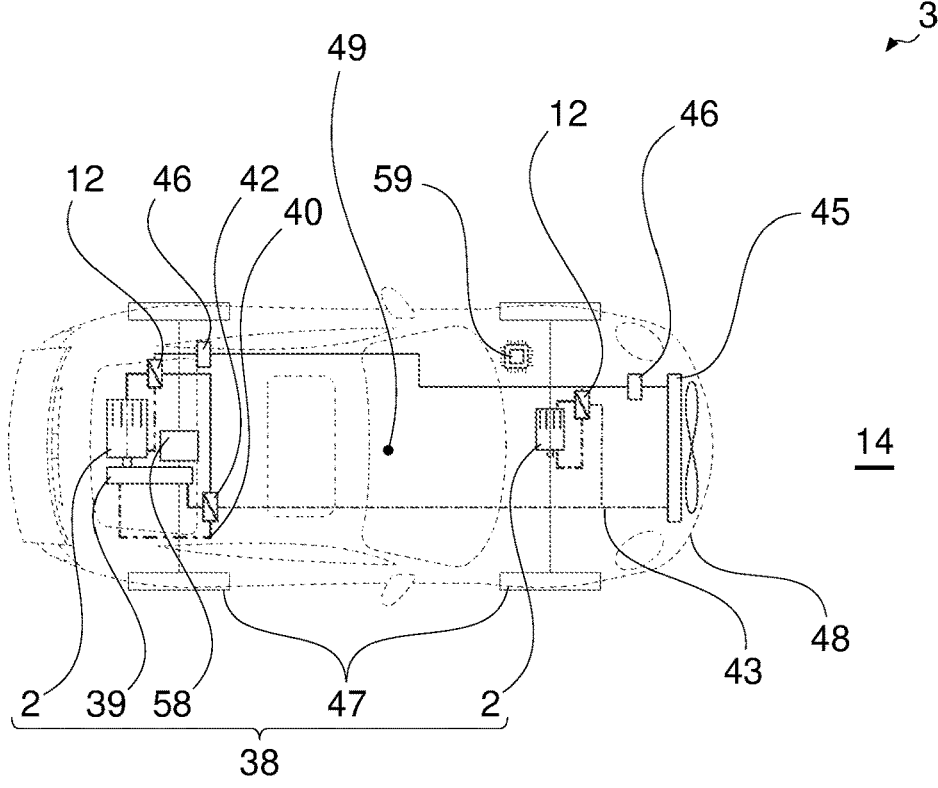
FIG. 6 illustrates a motor vehicle having a thermal management module in a schematic top view.

In FIG. 6, a motor vehicle 3 with a thermal management module 37 is shown in a schematic top plan view with a powertrain 38. The motor vehicle 3 comprises a transport cell 49, for example a passenger compartment, approximately in the center of its chassis 48, and four propulsion wheels 47 to propel the motor vehicle 3 on and to the side of its chassis 48. In front, there is an electric traction machine 2 (optionally purely coaxial here) and in rear, there is a further electric traction machine 2 (in this case purely optionally axially arranged), and in the rear, there is a transmission 39 and a differential 58, preferably wherein the differential 58 is integrated into the oil circuit 40. A pulse inverter 46 is provided for each of the front and rear electric traction machines 2. A water circuit 43 is configured for the temperature control of the pulse inverter 46 and the first heat exchangers 12 and the second heat exchanger 42, wherein the heat of the water circuit 43 can be dissipated to the environment 14 via a third heat exchanger 45 (shown here with a fan). The leading conduit is shown here with a solid line and the return line respectively as a dotted line so that the (third) circulation direction 44 of the water circuit 43 runs counterclockwise in the illustration. Likewise, this is shown in the cooling system 1 on the electric traction machines 2 and in the oil circuit 40. For example, the cooling systems 1, the oil circuit 40, and the water circuit 43 are embodied as shown in FIG. 2 (at least excerpts thereof). Furthermore, a processor 59 is indicated here by means of which the necessary control and/or control of the shown (and possibly further) components can be implemented. The processor 59 is configured as a CPU, for example, and/or is part of an on-board computer of the motor vehicle 3.

With the expansion tank and cooling system provided here, an efficient ventilation of the cooling liquid can be realized.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMBERS

1 Cooling system
2 Traction machine
3 Motor vehicle
4 Looped conduit system
5 First cooling liquid
6 First circulation pump
7 First circulation direction
8 Expansion tank
9 Gas
10 Motor input terminal
11 Motor output terminal
12 First heat exchanger
13 Aperture
14 Environment
15 Adsorption filter
16 Desiccant
17 Active carbon
18 Calming section
19 Calming labyrinth
20 Gas flow
21 Outflow-side valve
22 Inflow-side valve
23 Input
24 Output
25 First inlet
26 Second inlet
27 First outlet
28 Second outlet
29 Connection channel
30 Offset
31 Walls
32 First tank part
33 Second tank part
34 Third tank part
35 Partition
36 Labyrinth
37 Thermal management module
38 Powertrain
39 Transmission
40 Oil circuit
41 Second circulation direction
42 Second heat exchanger
43 Water circuit 44 Third circulation direction
45 Third heat exchanger
46 Pulse inverter
47 Drive wheel
48 Chassis
49 Transport cell
50 First coarse filter
51 Second coarse filter
52 Transmission component
53 Oil sump
54 Second circulation pump
55 Separating element
56 Lid
57 Separator
58 Differential
59 Processor

The invention claimed is:

1. A cooling system for an electric traction machine for a motor vehicle, comprising:
   a looped conduit system for conducting a first cooling liquid to be circulated;
   a circulation pump for conveying the first cooling liquid in the looped conduit system in a first circulation direction;
   an expansion tank, which is filled at least partially with the first cooling liquid to be circulated in the looped conduit system and at least partially with a gas;
   a motor input terminal for fluidically connecting the looped conduit system on an input side to an electric traction machine to be temperature-controlled;
   a motor output terminal for fluidically connecting the looped conduit system on an output side to the traction machine to be temperature-controlled;
   a first heat exchanger for dissipating heat from and/or supplying heat to the first cooling liquid to be circulated in the looped conduit system;
   an oil circuit for a transmission, the oil circuit having a second circulation direction and having a second heat exchanger; and
   a water circuit for at least one vehicle component, the water circuit having a third circulation direction and having a third heat exchanger,
      wherein the expansion tank is configured with an aperture that is open to the environment, and
   wherein the looped conduit system, the oil circuit, and the water circuit are fluidically separate from one another and configured such that the first heat exchanger transfers heat between the first cooling liquid and the water circuit and the second heat exchanger transfers heat between the oil circuit and the water circuit.

2. The according to claim 1, wherein an adsorption filter is provided from the aperture to the environment of the expansion tank for filtering of passing air, wherein the adsorption filter comprises a desiccant and/or activated carbon.

3. The cooling system according to claim 1, wherein the aperture of the expansion tank is communicatively connected to the environment via a calming section,
   wherein liquid is separable from a gas flow passing through the calming section via a calming labyrinth, and/or
   wherein an increased pressure in a gas flow passing through the calming section can be produced compared to a pressure in the aperture of the expansion tank.

4. The cooling system according to claim 3, wherein the liquid is separable by the calming section, and/or wherein the increased pressure in the gas flow is provided by the calming section.

5. The cooling system according to claim 1, wherein by at least one valve the aperture of the expansion tank can be closed to the environment.

6. The cooling system according to claim 5, wherein the at least one valve is normally closed, and can be opened by pressure control, and/or
   wherein at least one of the valves can be switchably closed in response to a pressure threshold and/or a temperature threshold.

7. The cooling system according to claim 1, wherein the aperture of the expansion tank is communicatively connected via an input and an output to the environment, wherein, for filtering of air solely via a semi-permeable membrane, the output is in connection with the environment and in a dirt-repelling and/or liquid-repelling manner.

8. The cooling system according to claim 1, wherein the expansion tank comprises:
   -at least one inlet configured to receive the first cooling liquid;
   a first outlet configured to output the first cooling liquid;
   a second outlet for configured to output the gas; and
   a connecting channel between the at least one inlet and the first and second outlets,
   wherein the connecting channel is configured to flare proceeding from the at least one inlet towards the first outlet for the first cooling liquid, and
   wherein, in an installation situation, one of the at least one inlets for the first cooling liquid and the second outlet for the gas is arranged in each operating state above the first outlet for the first cooling liquid by a horizontal offset.

9. The cooling system according to claim 8, wherein walls of the expansion tank are formed from:
   a first tank part, which comprises the at least one inlet for the first cooling liquid;
   a second tank part, which comprises the first and second outlets; and
   a third tank part, from which a partition is formed between the first tank part and the second tank part, and
   wherein the at least one inlet and the second outlet are communicatively connected to one another solely via a longest extension of the expansion tank.

10. The cooling system according to claim 8, wherein in the connecting channel, a labyrinth for retaining liquid is formed.

11. The cooling system according to claim 1, wherein the water circuit with the first heat exchanger of the cooling system is connected to the environment for heat transfer.

12. The cooling system according to claim 11, wherein the water circuit with the first heat exchanger of the cooling system is configured to transfer heat from the water circuit to the environment by forced convection, and wherein components cooled by the oil circuit and the looped conduit system are not cooled by forced convection.

13. The thermal management module according to claim 11, wherein in the third circulation direction of the water circuit, a pulse inverter for an electric traction machine is arranged upstream of the first heat exchanger.

14. A thermal management module for a powertrain of a motor vehicle, comprising:
   a looped conduit system for conducting a first cooling liquid to be circulated;
   a circulation pump for conveying the first cooling liquid in the looped conduit system in a first circulation direction;

an expansion tank, which is filled at least partially with the first cooling liquid to be circulated in the looped conduit system and at least partially with a gas, wherein the expansion tank is configured with an aperture that is open to the environment;

a motor input terminal for fluidically connecting the looped conduit system on an input side to an electric traction machine to be temperature-controlled;

a motor output terminal for fluidically connecting the looped conduit system on an output side to the traction machine to be temperature-controlled;

a first heat exchanger for dissipating heat from and/or supplying heat to the first cooling liquid to be circulated in the looped conduit system;

an oil circuit for a transmission, the oil circuit having a second circulation direction and having a second heat exchanger;

a water circuit for at least one vehicle component, the water circuit having a third circulation direction and having a third heat exchanger, for a transmission, an oil circuit having a second circulation direction and having a second heat exchanger; and for at least one vehicle component, a water circuit having a third circulation direction and having a third heat exchanger, wherein the looped conduit system, the oil circuit, and the water circuit are fluidically separate from one another and configured such that the first heat exchanger transfers heat between the first cooling liquid and the water circuit and the second heat exchanger transfers heat between the oil circuit and the water circuit.

15. The thermal management module of claim 14, wherein a pulse inverter for the electric traction machine is arranged in the water circuit.

* * * * *